(12) United States Patent
Kimura

(10) Patent No.: US 11,687,476 B2
(45) Date of Patent: Jun. 27, 2023

(54) MANAGEMENT APPARATUS, MANAGEMENT SYSTEM, MANAGEMENT METHOD, AND NON-TRANSITORY COMPUTER READABLE MEDIUM

(71) Applicant: NEC Corporation, Tokyo (JP)

(72) Inventor: Sadao Kimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 106 days.

(21) Appl. No.: 17/318,218

(22) Filed: May 12, 2021

(65) Prior Publication Data

US 2021/0357345 A1    Nov. 18, 2021

(30) Foreign Application Priority Data

May 14, 2020  (JP) .............................. JP2020-085313

(51) Int. Cl.
  *G06F 13/38*    (2006.01)
  *G06F 9/445*    (2018.01)
  *G06F 13/40*    (2006.01)

(52) U.S. Cl.
  CPC ........ *G06F 13/385* (2013.01); *G06F 9/44505* (2013.01); *G06F 13/4072* (2013.01)

(58) Field of Classification Search
  CPC . G06F 13/385; G06F 9/44505; G06F 13/4072
  See application file for complete search history.

(56) References Cited

U.S. PATENT DOCUMENTS 11,153,155 B1 * 10/2021 Perez .................. H04L 41/0809
11,411,829 B1 * 8/2022 Puhan ................. H04L 41/0806
2016/0182407 A1 * 6/2016 McCaughan ....... H04L 41/0886
              370/219
2020/0213191 A1 * 7/2020 Watsen ............... H04L 61/5014
2020/0296586 A1 * 9/2020 Murthy ................. H04L 63/061
2020/0313890 A1 * 10/2020 Mondello ............. H04W 4/023
2020/0358859 A1 * 11/2020 Gupta .................. H04L 67/148
2020/0403821 A1 * 12/2020 Dev .................... H04L 12/4633
2021/0036918 A1 * 2/2021 Singla .................... H04W 4/38

FOREIGN PATENT DOCUMENTS

JP    2018-137695 A    8/2018

* cited by examiner

*Primary Examiner* — Henry Tsai
*Assistant Examiner* — Aurangzeb Hassan

(57) ABSTRACT

A management apparatus (10) includes a request reception unit (111) configured to receive a transmission request for configuration information transmitted from a transmission apparatus (12), together with key information unique to the transmission apparatus (12) and feature information obtained from peripheral information of the transmission apparatus (12), a configuration-information extraction unit (112) configured to extract configuration information corresponding to the key information and the feature information added in the transmission request that is transmitted from the transmission apparatus (12) and received by the request reception unit (111) from a database in which a combination of key information, feature information, and configuration information for each transmission apparatus is registered, and a configuration-information output unit (113) configured to output the configuration information extracted by the configuration-information extraction unit (112) to the transmission apparatus (12) that has requested the configuration information.

8 Claims, 11 Drawing Sheets

MANAGEMENT APPARATUS, MANAGEMENT SYSTEM, MANAGEMENT METHOD, AND NON-TRANSITORY COMPUTER READABLE MEDIUM

INCORPORATION BY REFERENCE

This application is based upon and claims the benefit of priority from Japanese patent application No. 2020-085313, filed on May 14, 2020, the disclosure of which is incorporated herein in its entirety by reference.

TECHNICAL FIELD

The present disclosure relates to a management apparatus, a management system, a management method, and a non-transitory computer readable medium storing a management program.

BACKGROUND ART

In general, in the operations of a management system that manages transmission apparatuses, each of the transmission apparatuses holds configuration information including details of its configuration unique to the apparatus itself in the apparatus itself.

A method for automatically inputting (e.g., transmitting) appropriate configuration information to a newly installed transmission apparatus is also called ZTP (Zero Touch Provisioning). In the ZTP, firstly, the transmission apparatus notifies a management server, which manages configuration information, of information (key information) unique to the apparatus itself by using a commonly-used protocol or the like. After that, the management server extracts configuration information associated with the key information received from the transmission apparatus and inputs (e.g., transmits) the extracted configuration information to the transmission apparatus which has requested the configuration information. In this way, for example, the complicated work for installing a transmission apparatus is simplified and errors in configuration, which would otherwise occur due to the complicated work, are prevented from occurring.

For example, Japanese Unexamined Patent Application Publication No. 2018-137695 discloses a related technique. An information processing apparatus disclosed in Japanese Unexamined Patent Application Publication No. 2018-137695 includes a detection unit, a configuration-information acquisition unit, and a setting control unit. The detection unit detects a communication apparatus to be processed based on destination information assigned to the communication apparatus to be processed. The configuration-information acquisition unit acquires configuration information that should be set in the communication apparatus to be processed. The setting control unit records the configuration information acquired by the configuration-information acquisition unit in a predetermined storage area of the communication apparatus to be processed. In this way, it is possible to realize a state in which a communication apparatus which has been configured in a predetermined manner is installed in the environment of a customer more easily.

SUMMARY

However, the information processing apparatus disclosed in Japanese Unexamined Patent Application Publication No. 2018-137695 has the following problem. Specifically, in the information processing apparatus disclosed in Japanese Unexamined Patent Application Publication No. 2018-137695, when a communication apparatus (corresponding to the transmission apparatus) to be processed is replaced due to a failure thereof or the like, destination information (corresponding to the key information) assigned to the new communication apparatus is different from the one assigned to the original communication apparatus. In this case, the detection unit cannot detect the communication apparatus to be processed by using the destination information alone. Therefore, in the above-described information processing apparatus, there is a problem that appropriate configuration information cannot be input (e.g., transmitted) to the communication apparatus to be processed.

An example object of the present disclosure is to provide a management apparatus, a management system, a management method, and a management program capable of solving the above-described problem.

In a first example aspect, a management apparatus includes: a request reception unit configured to receive a transmission request for configuration information transmitted from a transmission apparatus or a communication apparatus including the transmission apparatus disposed therein, together with key information unique to the transmission apparatus and feature information obtained from peripheral information of the transmission apparatus, the key information and the feature information being added in the transmission request; a configuration-information extraction unit configured to extract configuration information corresponding to the key information and the feature information added in the transmission request received by the request reception unit from a database in which a combination of key information, feature information, and configuration information for each transmission apparatus is registered; and a configuration-information output unit configured to output the configuration information extracted by the configuration-information extraction unit to the transmission apparatus or the communication apparatus that has transmitted the transmission request.

In another example aspect, a management method includes: receiving a transmission request for configuration information transmitted from a transmission apparatus or a communication apparatus including the transmission apparatus disposed therein, together with key information unique to the transmission apparatus and feature information obtained from peripheral information of the transmission apparatus, the key information and the feature information being added in the transmission request; extracting configuration information corresponding to the key information and the feature information added in the transmission request from a database in which a combination of key information, feature information, and configuration information for each transmission apparatus is registered; and outputting the extracted configuration information to the transmission apparatus or the communication apparatus that has transmitted the transmission request.

In another example aspect, a management program causes a computer to perform: a process for receiving a transmission request for configuration information transmitted from a transmission apparatus or a communication apparatus including the transmission apparatus disposed therein, together with key information unique to the transmission apparatus and feature information obtained from peripheral information of the transmission apparatus, the key information and the feature information being added in the transmission request; a process for extracting configuration information corresponding to the key information and the feature information added in the transmission request from a database in which a combination of key information, feature information, and configuration information for each transmission apparatus is registered; and a process for outputting the extracted configuration information to the transmission apparatus or the communication apparatus that has transmitted the transmission request.

BRIEF DESCRIPTION OF DRAWINGS

The above and other aspects, features and advantages of the present disclosure will become more apparent from the following description of certain example embodiments when taken in conjunction with the accompanying drawings, in which.

EMBODIMENTS

Figure 1:
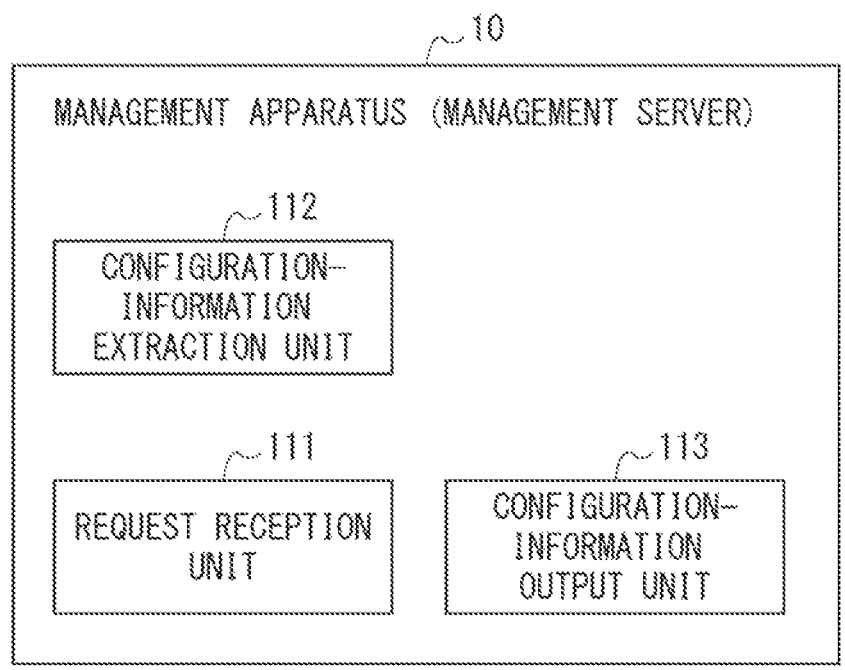
FIG. 1 is a block diagram schematically showing a management apparatus according to a first example embodiment.

Example embodiments will be described hereinafter with reference to the drawings. Note that since the drawings are drawn in a simplified manner, the technical scope of the example embodiments should not be narrowly interpreted based on the descriptions of the drawings. Further, the same elements are denoted by the same reference numerals (or symbols), and redundant descriptions thereof are omitted.

In the following example embodiments, when necessary, the present disclosure is explained by using separate sections or separate example embodiments. However, those example embodiments are not unrelated with each other, unless otherwise specified. That is, they are related in such a manner that one example embodiment is a modified example, an application example, a detailed example, or a supplementary example of a part or the whole of another example embodiment. Further, in the following example embodiments, when the number of elements or the like (including numbers, values, quantities, ranges, and the like) is mentioned, the number is not limited to that specific number except for cases where the number is explicitly specified or the number is obviously limited to a specific number based on its principle. That is, a larger number or a smaller number than the specific number may be also used.

Further, in the following example embodiments, their components (including operation steps and the like) are not necessarily indispensable except for cases where the component is explicitly specified or the component is obviously indispensable based on its principle. Similarly, in the following example embodiments, when a shape, a position relation, or the like of a component(s) or the like is mentioned, shapes or the likes that are substantially similar to or resemble that shape are also included in that shape except for cases where it is explicitly specified or they are eliminated based on its principle. This is also true for the above-described number or the like (including numbers, values, quantities, ranges, and the like).

FIRST EXAMPLE EMBODIMENT

FIG. 1 is a block diagram schematically showing a management apparatus (a management server) 10 according to a first example embodiment. The management apparatus 10 is a server that manages configuration information of one or a plurality of transmission apparatuses 12, and as shown in FIG. 1, includes at least a request reception unit 111, a configuration-information extraction unit 112, and a configuration-information output unit 113. The management apparatus 10 is connected to a configuration-information DB (Data Base) 13 (not shown) and one or a plurality of transmission apparatuses 12 (not shown) through a wired or wireless network.

In this example embodiment, it is assumed that, for each transmission apparatus 12, key information, feature information, and configuration information are associated with each other and registered in the configuration-information DB 13 in advance. In practice, the registration process of a combination of key information, feature information, and configuration information for each transmission apparatus 12 in the configuration-information DB 13 is carried out by the management apparatus 10 or the like.

The key information is information assigned to the transmission apparatus 12 and unique to the transmission apparatus 12, and is, for example, a serial number or a MAC (Media Access Control) address of the transmission apparatus 12. The feature information is information that is obtained from peripheral information of a device provided in the transmission apparatus 12 (e.g., an interface card), a device disposed near the transmission apparatus 12 (e.g., another transmission apparatus 12), or the like, and is used to support the identification of the transmission apparatus 12. The configuration information is information including details of a configuration that is applied to the transmission apparatus 12, and is information so-called config information. Note that the configuration-information DB 13 may be disposed inside the management apparatus 10.

The request reception unit 111 receives a transmission request for configuration information transmitted from the transmission apparatus 12 or a communication apparatus (such as a smartphone) including the transmission apparatus 12 disposed therein. In the following description, an example case is given in which the request reception unit 111 receives a transmission request for configuration information transmitted from the transmission apparatus 12, but the present disclosure is not limited to this example. The request reception unit 111 may instead receive a transmission request for configuration information transmitted from a communication apparatus including the transmission apparatus 12 disposed therein.

Note that key information unique to the transmission apparatus 12 and feature information obtained from peripheral information of the transmission apparatus 12 are added (i.e., contained) in the transmission request for the configuration information transmitted from the transmission apparatus 12.

The configuration-information extraction unit 112 extracts configuration information corresponding to the key information and the feature information added in the transmission request for the configuration information transmitted from the transmission apparatus 12 from among a plurality of pieces of configuration information registered in the configuration-information DB 13.

Specifically, the configuration-information extraction unit 112 selects key information that matches the key information added in the transmission request for the configuration information transmitted from the transmission apparatus 12 from among a plurality of pieces of key information registered in the configuration-information DB 13. Then, the configuration-information extraction unit 112 extracts configuration information associated with the selected key information from the configuration-information DB 13.

Note that when there is no key information that matches the key information added in the transmission request for the configuration information transmitted from the transmission apparatus 12 in the configuration-information DB 13, the configuration-information extraction unit 112 then extracts configuration information by using feature information.

Specifically, the configuration-information extraction unit 112 selects, from among a plurality of pieces of feature information registered in the configuration-information DB 13, feature information with which the degree of matching of the feature information added in the transmission request for the configuration information transmitted from the transmission apparatus 12 is equal to or larger than a threshold. Then, the configuration-information extraction unit 112 extracts configuration information associated with the selected feature information from the configuration-information DB 13. The threshold can be set to an arbitrary value, and may be set to, for example, about 70%.

The configuration-information output unit 113 inputs (i.e., transmits) the configuration information extracted from the configuration-information DB 13 by the configuration-information extraction unit 112 to the transmission apparatus 12 which has requested the configuration information. In this way, the transmission apparatus 12 is configured according to the configuration information.

Here, it is assumed that, when the transmission apparatus 12 is replaced due to a failure thereof or the like, the original transmission apparatus 12 before the replacement is referred to as the transmission apparatus 12_old and the new transmission apparatus 12 after the replacement is referred to as the transmission apparatus 12_new. Then, the key information assigned to the transmission apparatus 12_new is different from the one assigned to the transmission apparatus 12_old. In this case, the management apparatus 10 cannot select and input (e.g., transmit) appropriate configuration information to the transmission apparatus 12_new by using the key information alone. Further, it is also difficult to associate key information of a reserve apparatus with configuration information thereof in advance as a precaution against the failure or the like of the transmission apparatus 12.

Therefore, the management apparatus 10 extracts configuration information that should be input to the transmission apparatus 12_new from the configuration-information DB 13 by using, in addition to the key information, feature information extracted from peripheral information of the transmission apparatus 12_new.

Note that it is considered that, ideally, the feature information extracted from the peripheral information of the transmission apparatus 12_new matches the feature information extracted from the peripheral information of the transmission apparatus 12_old as long as the peripheral transmission apparatus remains unchanged. Therefore, the management apparatus 10 can correctly extract the configuration information that should be input to the transmission apparatus 12_new from the configuration-information DB 13 by using the feature information extracted from the peripheral information of the transmission apparatus 12_new.

As described above, the management apparatus 10 can correctly extract the configuration information associated with the key information unique to the transmission apparatus 12 and/or the feature information obtained from the peripheral information of the transmission apparatus 12 from the configuration-information DB 13 by using, in addition to the key information, the feature information. In this way, the management apparatus 10 can input (e.g., transmit) appropriate configuration information to the transmission apparatus 12, which has requested the configuration information, even when the transmission apparatus 12 has been replaced due to a failure thereof or the like.

Note that the management apparatus 10 includes, as a part of its configuration (not shown), a processor, a memory, and a storage device. Further, in the storage device, a computer program(s) in which the processes performed by the management apparatus 10 according to this example embodiment are implemented is stored. Further, the processor loads the computer program from the storage device into the memory, and executes the loaded computer program. In this way, the processor implements the functions of the request reception unit 111, the configuration-information extraction unit 112, and the configuration-information output unit 113.

Alternatively, each of the request reception unit 111, the configuration-information extraction unit 112, and the configuration-information output unit 113 may be implemented by dedicated hardware. Further, some or all of the components of the management apparatus 10 may be implemented by a general-purpose or special-purpose circuit (circuitry), a processor or the like, or a combination thereof. They may be formed by a single chip, or may be formed by a plurality of chips connected to each other through a bus. Some or all of the components of the management apparatus 10 may be implemented by a combination of the above-described circuit or the like and a program(s). Further, as the processor, a CPU (Central Processing Unit), a GPU (Graphics Processing Unit), an FPGA (Field-Programmable Gate Array), or the like may be used.

Further, when some or all of the components of the management apparatus 10 are implemented by a plurality of information processing apparatuses, circuits, or the like, the plurality of information processing apparatuses, the circuits, or the like may be disposed in one place or arranged in a distributed manner. For example, the information processing apparatuses, the circuits, and the like may be implemented as a client-server system, a cloud computing system or the like, or a configuration in which the apparatuses or the like are connected to each other through a communication network.

Alternatively, the functions of the management apparatus 10 may be provided in the form of SaaS (Software as a Service).

SECOND EXAMPLE EMBODIMENT

Figure 2:
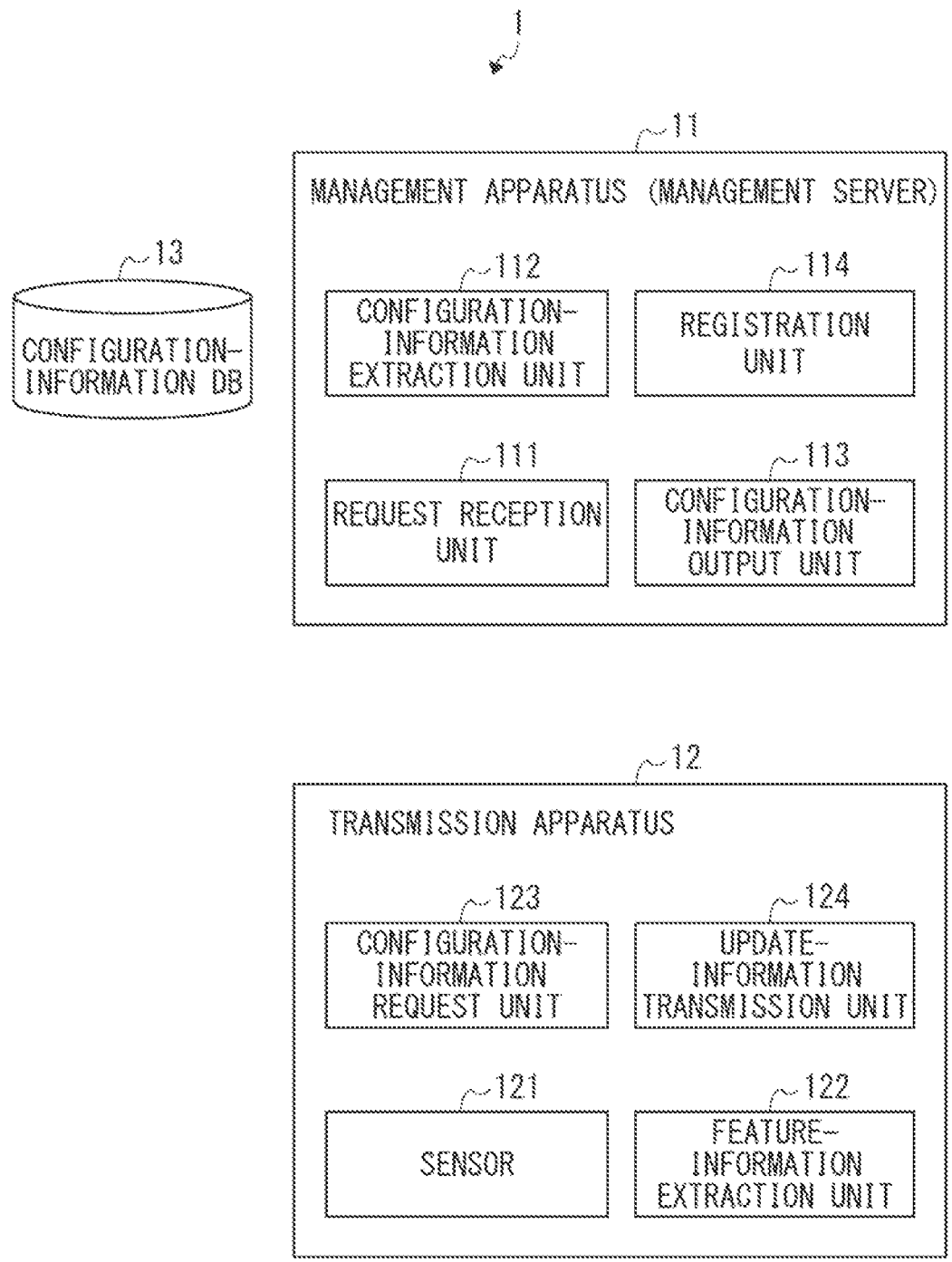
FIG. 2 is a block diagram showing an example of a configuration of a management system according to a second example embodiment.

FIG. 2 is a block diagram showing an example of a configuration of a management system 1 according to a second example embodiment. As shown in FIG. 2, the management system 1 includes a management apparatus (a management server) 11, which is a specific example of the management apparatus 10, one or a plurality of transmission apparatuses 12, and a configuration-information DB 13. The management apparatus 11, the transmission apparatuses 12, and the configuration-information DB 13 are connected to each other through a wired or wireless network. In the following description, another transmission apparatus(es) 12 (not shown), which is different from the aforementioned transmission apparatus 12 to be configured and located near the aforementioned transmission apparatus 12 to be configured, is also referred to as a peripheral transmission apparatus(es) 52.

(Details of Transmission Apparatus 12)

The transmission apparatus 12 includes a sensor 121, a feature-information extraction unit 122, a configuration-information request unit 123, and an update-information transmission unit 124.

The sensor 121 collects peripheral information of the transmission apparatus 12 (hereinafter also referred to as the own apparatus 12) (i.e., collects information about surroundings (or the periphery) of the transmission apparatus 12). For example, the sensor 121 collects, as the peripheral information, packets of control protocols of a communication layer 2 (L2) and a communication layer 3 (L3) transmitted from the peripheral transmission apparatus 52. Specifically, the packets of the control protocol of the communication layer 2 are packets of a spanning tree protocol or the like. Further, the packets of the control protocol of the communication layer 3 are packets of a routing protocol or the like.

The feature-information extraction unit 122 extracts feature information that is used to support the identification of the transmission apparatus 12 from the peripheral information collected by the sensor 121. Specifically, the feature-information extraction unit 122 extracts, as the feature information, identification information (ID) or the like of a peripheral transmission apparatus 52, included in a packet transmitted from that peripheral transmission apparatus 52.

For example, when a packet called BPDU of an RSTP, which is the control protocol of the communication layer 2, is collected by the sensor 121, the feature-information extraction unit 122 extracts a BRIDGE ID included in that packet as the feature information. Note that the BRIDGGE ID is an ID of a peripheral transmission apparatus 52. Further, the RSTP is an abbreviation of Rapid Spanning Tree Protocol, and the BPDU is an abbreviation of Bridge Protocol Data Unit.

Alternatively, when a packet of a protocol called LLDP is collected by the sensor 121, the feature-information extraction unit 122 extracts a Chassis ID included in that packet as the feature information. Note that the Chassis ID is an ID of a peripheral transmission apparatus 52. Further, the LLDP is an abbreviation of Link Layer Discovery Protocol.

Alternatively, when a packet of an OSPF protocol is collected by the sensor 121, the feature-information extraction unit 122 extracts a Router ID included in that packet as the feature information. Note that the Router ID is an ID of a peripheral transmission apparatus 52. Further, the OSPF is an abbreviation of Open Shortest Path First.

Note that although the sensor 121 may collect only a specific type of packets as the peripheral information, the sensor 121 preferably collects various types of packets as the peripheral information. In this way, the accuracy of the identification of the transmission apparatus 12 using the feature information obtained from the peripheral information is improved. Further, the setting as to what kind of feature information should be extracted can be omitted.

Specifically, the sensor 121 preferably collects, in addition to RSTP packets (BPDUs), LLDP packets and OSPF protocol packets. In this case, the feature-information extraction unit 122 extracts, in addition to a BRIDGE ID, a Chassis ID and a Router ID from these packets.

The configuration-information request unit 123 requests the management apparatus 11 to transmit configuration information that should be applied to the own apparatus 12. Note that the configuration information is information including details of a configuration that is applied to the transmission apparatus 12, and is information so-called config information.

Note that the configuration-information request unit 123 transmits a transmission request for configuration information to the management apparatus 11, and also transmits key information unique to the own apparatus 12 and feature information obtained from peripheral information as first key information and second key information, respectively, to the management apparatus 11. Note that the key information unique to the transmission apparatus 12 (the first key information) is information assigned to the transmission apparatus 12 in order to identify the transmission apparatus 12, and is, for example, a serial number, a MAC address, or the like.

After the configuration information is applied (i.e., input) to the own apparatus 12, the update-information transmission unit 124 periodically acquires feature information and transmits the acquired feature information to the management apparatus 11 together with key information. In this way, the configuration-information DB 13 is updated in the management apparatus 11.

(Details of Management Apparatus 11)

The management apparatus 11 is a server that manages configuration information of one or a plurality of transmission apparatuses 12, and includes the request reception unit 111, the configuration-information extraction unit 112, the configuration-information output unit 113, and a registration unit 114.

The registration unit 114 associates the key information, the feature information, and the configuration information of each transmission apparatus 12 with each other, and registers them in the configuration-information DB 13. For example, the registration unit 114 first associates the key information assigned to the transmission apparatus 12 with the configuration information that should be input (e.g., transmit) to the transmission apparatus 12, and registers them in the configuration-information DB 13 in advance. After that, the registration unit 114 registers the feature information transmitted from the update-information transmission unit 124 provided in the transmission apparatus 12 in the configuration-information DB 13 in association with the key information and the configuration information which have already been registered in the configuration-information DB 13. More specifically, the registration unit 114 selects key information that matches the key information transmitted from the update-information transmission unit 124 together with the feature information from among a plurality of pieces of key information registered in the configuration-information DB 13. Then, the registration unit 114 registers the feature information transmitted from the update-information transmission unit 124 in the configuration-information DB 13 in association with the selected key information.

Further, the registration unit 114 also associates feature information that is periodically transmitted from the update-information transmission unit 124 provided in the transmission apparatus 12 with the corresponding key information and the configuration information, and registers them in the configuration-information DB 13 again. That is, the registration unit 114 also functions as an updating-process unit.

Note that, in this example embodiment, an example case in which the configuration-information DB 13 is located outside the management apparatus 11 will be described, but the present disclosure is not limited to this example. The configuration-information DB 13 may be disposed inside the management apparatus 11.

The request reception unit 111 receives a transmission request for configuration information transmitted from the transmission apparatus 12. Note that, as described above, the transmission request for the configuration information transmitted from the transmission apparatus 12 includes key information unique to the transmission apparatus 12 and feature information obtained from peripheral information of the transmission apparatus 12.

The configuration-information extraction unit 112 extracts configuration information corresponding to the key information and the feature information added in the transmission request for the configuration information transmitted from the transmission apparatus 12 from among a plurality of pieces of configuration information registered in the configuration-information DB 13.

Specifically, the configuration-information extraction unit 112 selects key information that matches the key information added in the transmission request for the configuration information transmitted from the transmission apparatus 12 from among a plurality of pieces of key information registered in the configuration-information DB 13. Then, the configuration-information extraction unit 112 extracts configuration information associated with the selected key information from the configuration-information DB 13.

Note that when there is no key information that matches the key information added in the transmission request for the configuration information transmitted from the transmission apparatus 12 in the configuration-information DB 13, the configuration-information extraction unit 112 then extracts configuration information by using feature information.

Specifically, the configuration-information extraction unit 112 selects, from among a plurality of pieces of feature information registered in the configuration-information DB 13, feature information with which the degree of matching of the feature information added in the transmission request for the configuration information transmitted from the transmission apparatus 12 is equal to or larger than a threshold. Then, the configuration-information extraction unit 112 extracts configuration information associated with the selected feature information from the configuration-information DB 13.

The threshold can be set to an arbitrary value, and may be set to, for example, about 70%. By using the threshold, it is possible to identify the transmission apparatus 12 even when a part of the feature information obtained from the peripheral information is changed due to the replacement of the peripheral transmission apparatus 52 or the like. Therefore, in order to improve the accuracy of the identification of the transmission apparatus 12, it is preferred to collect as many pieces (or types) of feature information as possible.

The configuration-information output unit 113 inputs (i.e., transmits) the configuration information extracted from the configuration-information DB 13 by the configuration-information extraction unit 112 to the transmission apparatus 12 which has requested the configuration information. In this way, the transmission apparatus 12 is configured according to the configuration information.

Here, it is assumed that, when the transmission apparatus 12 is replaced due to a failure thereof or the like, the original transmission apparatus 12 before the replacement is referred to as the transmission apparatus 12_old and the new transmission apparatus 12 after the replacement is referred to as the transmission apparatus 12_new. Then, the key information assigned to the transmission apparatus 12_new is different from the one assigned to the transmission apparatus 12_old. In this case, the management apparatus 11 cannot select and input (e.g., transmit) appropriate configuration information to the transmission apparatus 12_new by using the key information alone. Further, it is also difficult to associate key information of a reserve apparatus with configuration information thereof in advance as a precaution against the failure or the like of the transmission apparatus 12.

Therefore, the management apparatus 11 extracts configuration information that should be input to the transmission apparatus 12_new from the configuration-information DB 13 by using, in addition to the key information, feature information extracted from peripheral information of the transmission apparatus 12_new.

Note that it is considered that, ideally, the feature information extracted from the peripheral information of the transmission apparatus 12_new matches the feature information extracted from the peripheral information of the transmission apparatus 12_old as long as the peripheral transmission apparatus 52 remains unchanged. Therefore, the management apparatus 11 can correctly extract the configuration information that should be input to the transmission apparatus 12_new from the configuration-information DB 13 by using the feature information extracted from the peripheral information of the transmission apparatus 12_new.

As described above, in the management system 1, the management apparatus 11 can correctly extract the configuration information associated with the key information unique to the transmission apparatus 12 and/or the feature information obtained from the peripheral information of the transmission apparatus 12 from the configuration-information DB 13 by using, in addition to the key information, the feature information. In this way, the management apparatus 11 can input (e.g., transmit) appropriate configuration information to the transmission apparatus 12, which has requested the configuration information, even when the transmission apparatus 12 has been replaced due to a failure thereof or the like.

In this example embodiment, an example case in which the sensor 121 collects packets transmitted from the peripheral transmission apparatus 52 as peripheral information has been described, but the present disclosure is not limited to this example. The sensor 121 may collect, as the peripheral information, information other than those contained in packets transmitted from the peripheral transmission apparatus 52 as long as the feature-information extraction unit 122 can extract feature information that is effectively used to identify the transmission apparatus 12.

(Flow of Management of Configuration Information in Management System 1)

Figure 3:
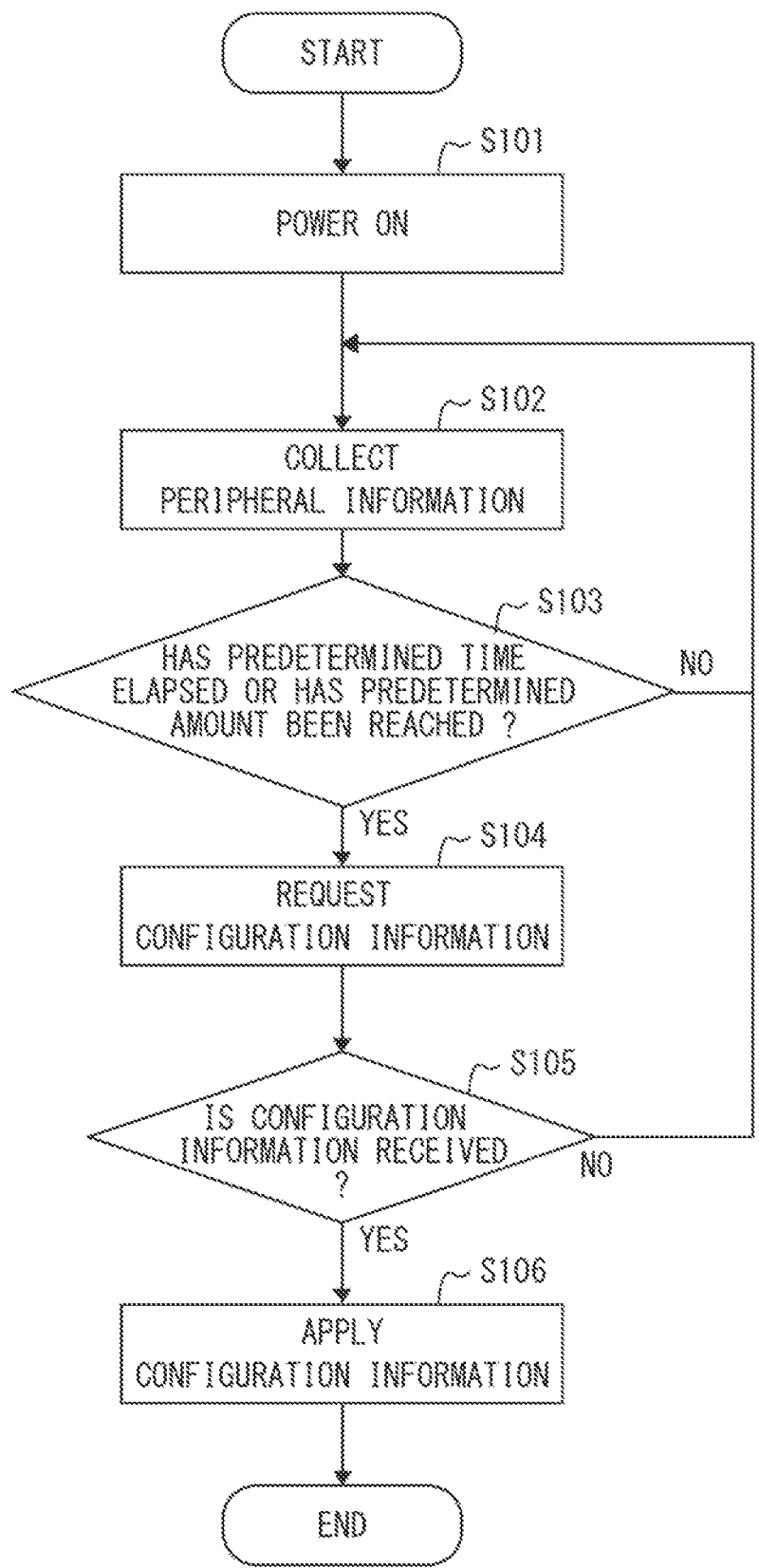
FIG. 3 is a flowchart showing a flow of a request for configuration information transmitted from a transmission apparatus provided in the management system shown in FIG. 2 to a management apparatus.
Figure 4:
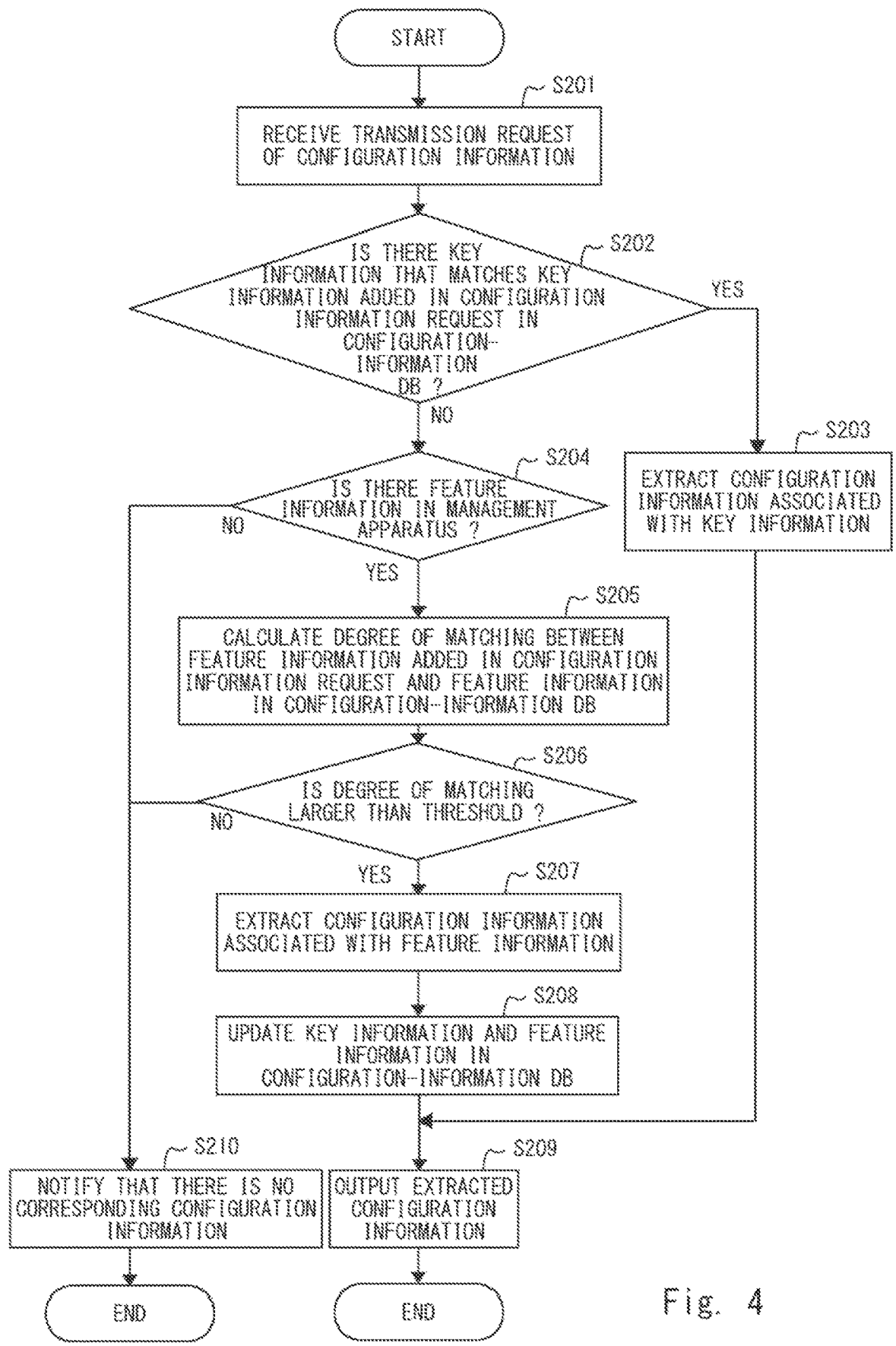
FIG. 4 is a flowchart showing a flow of management of the configuration information by the management apparatus provided in the management system shown in FIG. 2.
Figure 5:
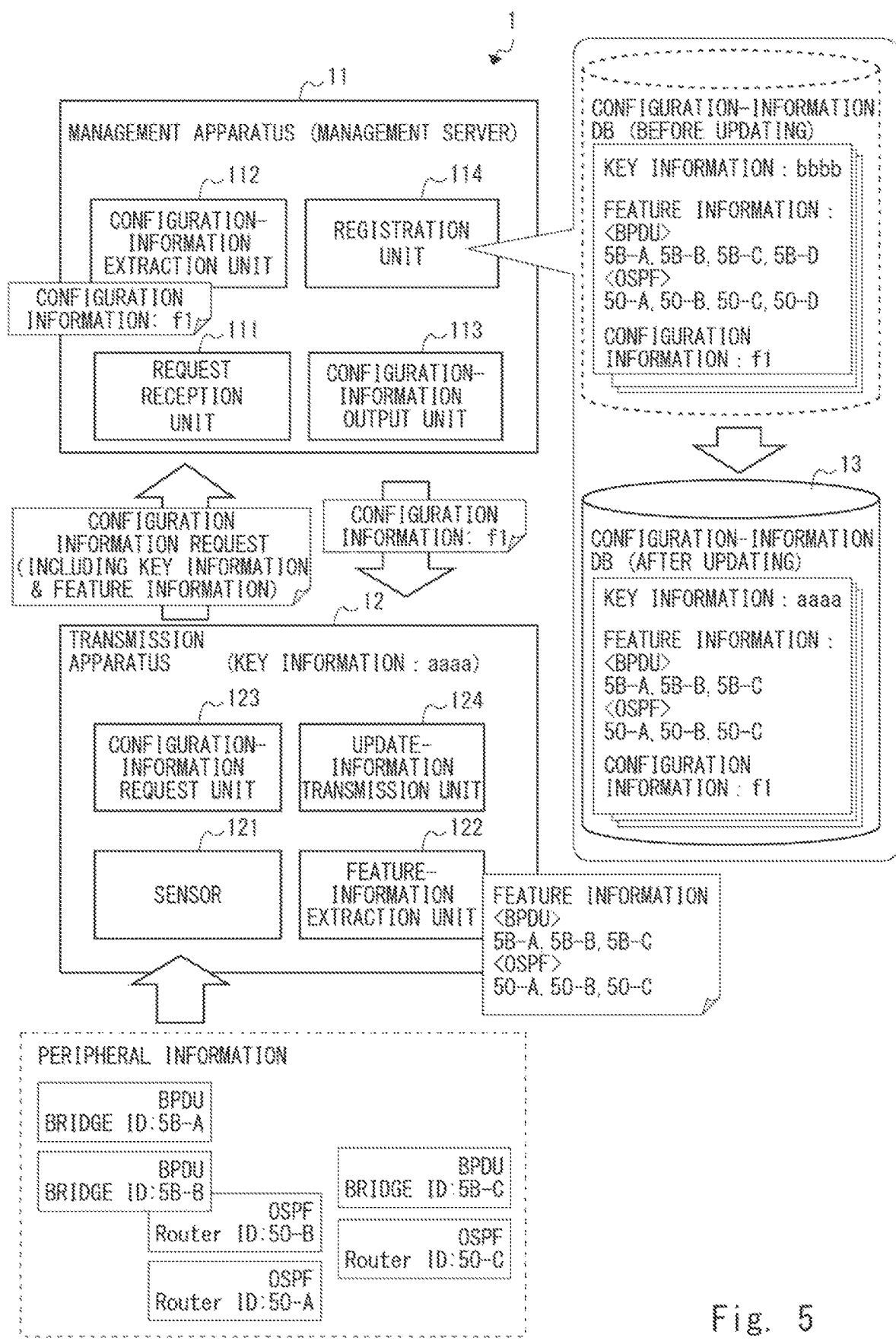
FIG. 5 is a diagram for explaining the flow of the management of the configuration information by the management system shown in FIG. 2.

Next, a flow of management of configuration information in the management system 1 will be described with reference to FIGS. 3, 4 and 5. FIG. 3 is a flowchart showing a flow of a request for configuration information transmitted from the transmission apparatus 12 to the management apparatus 11. FIG. 4 is a flowchart showing a flow of management of configuration information by the management apparatus 11. FIG. 5 is a diagram for explaining the flow of the management of the configuration information in the management system 1.

Firstly, a flow of a request for configuration information transmitted from the transmission apparatus 12 to the management apparatus 11 will be described with reference to FIGS. 3 and 5.

When the transmission apparatus 12 is powered on (step S101), its operating state changes to a peripheral-information collecting state. In the peripheral-information collecting state, the transmission apparatus 12 just receives packets transmitted from a peripheral device(s) without transmitting any packet to the peripheral device(s). Note that the transmission apparatus 12 collects peripheral information by using the sensor 121 for a predetermined time or until a predetermined amount of peripheral information is collected (step S102->NO in step S103).

For example, the sensor 121 collects, as the peripheral information, packets of control protocols of a communication layer 2 (L2) and a communication layer 3 (L3) transmitted from the peripheral transmission apparatus 52. In the example shown in FIG. 5, for example, the sensor 121 collects packets called BPDUs of an RSTP, which is the control protocol of a communication layer 2, or collects packets of an OSPF protocol.

Further, the feature-information extraction unit 122 extracts feature information that is used to support the identification of the transmission apparatus 12 from the peripheral information collected by the sensor 121. In the example shown in FIG. 5, the feature-information extraction unit 122 extracts BRIDGE IDs: 5B-A to 5B-C, which are IDs of peripheral transmission apparatuses 52, from packets called BPDUs of the RSTP. Further, the feature-information extraction unit 122 extracts Router IDs: 5O-A to 5O-C, which are IDs of peripheral transmission apparatuses 52, from packets of the OSPF protocol.

When the predetermined time has elapsed or when the predetermined amount of peripheral information has been collected (YES in step S103), the configuration-information request unit 123 requests the management apparatus 11 to transmit configuration information that should be applied to the own apparatus 12 (step S104). Note that the configuration-information request unit 123 adds the key information and the feature information in the transmission request for the configuration information when transmitting the transmission request to the management apparatus 11. In the example shown in FIG. 5, the configuration-information request unit 123 transmits, to the management apparatus 11, a serial number aaaa as the key information, and BRIDGE IDs: 5B-A to 5B-C and Router IDs: 5O-A to 5O-C as the feature information.

Note that the transmission apparatus 12 needs to obtain information about the management apparatus 11, which requests the configuration information, in advance. However, since a method for obtaining such information similar to a method that is used in, for example, ordinary ZTP or the like can be used for this purpose, the description thereof is omitted. Note that the ZTP is an abbreviation of Zero Touch Provisioning.

Upon receiving the transmission request for the configuration information transmitted from the transmission apparatus 12, the management apparatus 11 selects appropriate configuration information and outputs the selected configuration information to the transmission apparatus 12. A flow of management of configuration information for the transmission apparatus 12 by the management apparatus 11 will be described later.

When the transmission apparatus 12 receives the configuration information transmitted from the management apparatus 11 (YES in step S105), the transmission apparatus 12 is configured according to the configuration information (step S106).

Note that if the transmission apparatus 12 cannot receive the configuration information (NO in step S105), i.e., if the management apparatus 11 cannot extract appropriate configuration information for the transmission apparatus 12, the transmission apparatus 12 collects peripheral information again (step S102).

Next, a flow of management of configuration information for the transmission apparatus 12 by the management apparatus 11 will be described with reference to FIGS. 4 and 5.

In the management apparatus 11, the request reception unit 111 receives a transmission request for configuration information transmitted from the transmission apparatus 12 (step S201). Note that, as described previously, the transmission request for the configuration information transmitted from the transmission apparatus 12 includes key information unique to the transmission apparatus 12 and feature information obtained from peripheral information of the transmission apparatus 12.

After that, the configuration-information extraction unit 112 retrieves key information that matches the key information added in the transmission request for the configuration information transmitted from the transmission apparatus 12 from among a plurality of pieces of key information registered in the configuration-information DB 13 (step S202).

For example, when there is key information that matches the key information added in the transmission request for the configuration information transmitted from the transmission apparatus 12 in the configuration-information DB 13 (YES in step S202), the configuration-information extraction unit 112 extracts configuration information associated with that key information from the configuration-information DB 13 (step S203).

Then, the configuration-information output unit 113 outputs the configuration information extracted from the configuration-information DB 13 to the transmission apparatus 12 which has requested the configuration information (step S209). In this way, the transmission apparatus 12 is configured according to the configuration information.

On the other hand, when there is no key information that matches the key information added in the transmission request for the configuration information transmitted from the transmission apparatus 12 in the configuration-information DB 13 (NO in step S202), the configuration-information extraction unit 112 then extracts configuration information by using feature information (YES in step S204).

Specifically, the configuration-information extraction unit 112 retrieves, from among a plurality of pieces of feature information registered in the configuration-information DB 13, feature information with which the degree of matching of the feature information added in the transmission request for the configuration information transmitted from the transmission apparatus 12 is equal to or larger than a threshold (step S205->step S206).

For example, when there is feature information with which the degree of matching of the feature information added in the transmission request for the configuration information is equal to or larger than the threshold in the configuration-information DB 13 (YES in step S206), the configuration-information extraction unit 112 extracts configuration information associated with that feature information from the configuration-information DB 13 (step S207).

In the example shown in FIG. 5, the following combination of key information, feature information, and configuration information are registered in the configuration-information DB 13. That is, in the configuration-information DB 13, a serial number bbbb is registered as key information, and BRIDGE IDs: 5B-A to 5B-D and Router IDs: 5O-A to 5O-D are registered as configuration information. Further, information f1 is registered as configuration information. Note that when the threshold is set to 70%, it is considered that the feature information added in the transmission request for the configuration information and the feature information registered in the configuration-information DB 13 match each other because the degree of matching between them is 75% (=%). Therefore, the configuration-information extraction unit 112 extracts the configuration information f1 from the configuration-information DB 13.

Further, at this point, the key information and the feature information registered in the configuration-information DB 13 are updated to the key information and the feature information added in the transmission request for the configuration information transmitted from the transmission apparatus 12 (step S208). In the example shown in FIG. 5, the key information is updated from aaaa to bbbb. Further, the feature information was updated from BRIDGE IDs: 5B-A to 5B-D and Router IDs: 5O-A to 5O-D to BRIDGE IDs: 5B-A to 5B-C and Router IDs: 5O-A to 5O-C, respectively.

After that, the configuration-information output unit 113 outputs the configuration information extracted from the configuration-information DB 13 to the transmission apparatus 12 which has requested the configuration information (step S209). In this way, the transmission apparatus 12 is configured according to the configuration information.

Note that when the feature information is not registered in the configuration-information DB 13 (NO in step S204), the configuration-information output unit 113 notifies the transmission apparatus 12 that, for example, there is no appropriate configuration information (step S210). Similarly, when there is no feature information with which the degree of matching of the feature information added in the transmission request for the configuration information is equal to or larger than the threshold in the configuration-information DB 13 (NO in step S206), the configuration-information output unit 113 notifies the transmission apparatus 12 that, for example, there is no appropriate configuration information (step S210).

As described above, in the management system 1, the management apparatus 11 can correctly extract the configuration information associated with the key information unique to the transmission apparatus 12 and/or the feature information obtained from the peripheral information of the transmission apparatus 12 from the configuration-information DB 13 by using, in addition to the key information, the feature information. In this way, the management apparatus 11 can input (e.g., transmit) appropriate configuration information to the transmission apparatus 12, which has requested the configuration information, even when the transmission apparatus 12 has been replaced due to a failure thereof or the like.

(Flow of Updating of Feature Information in Management System 1)

Figure 6:
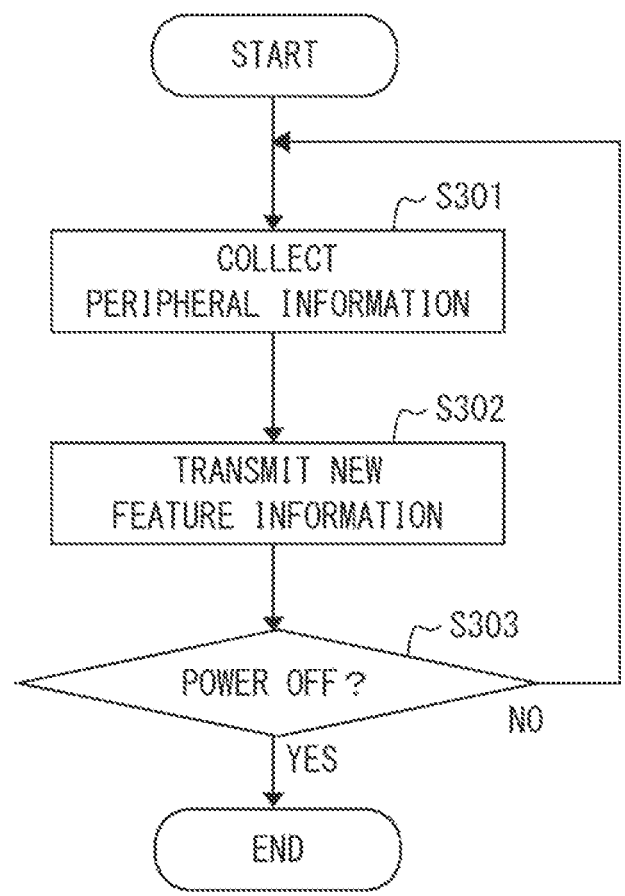
FIG. 6 is a flowchart showing a flow of a notification of update information transmitted from the transmission apparatus provided in the management system shown in FIG. 2 to the management apparatus.
Figure 7:
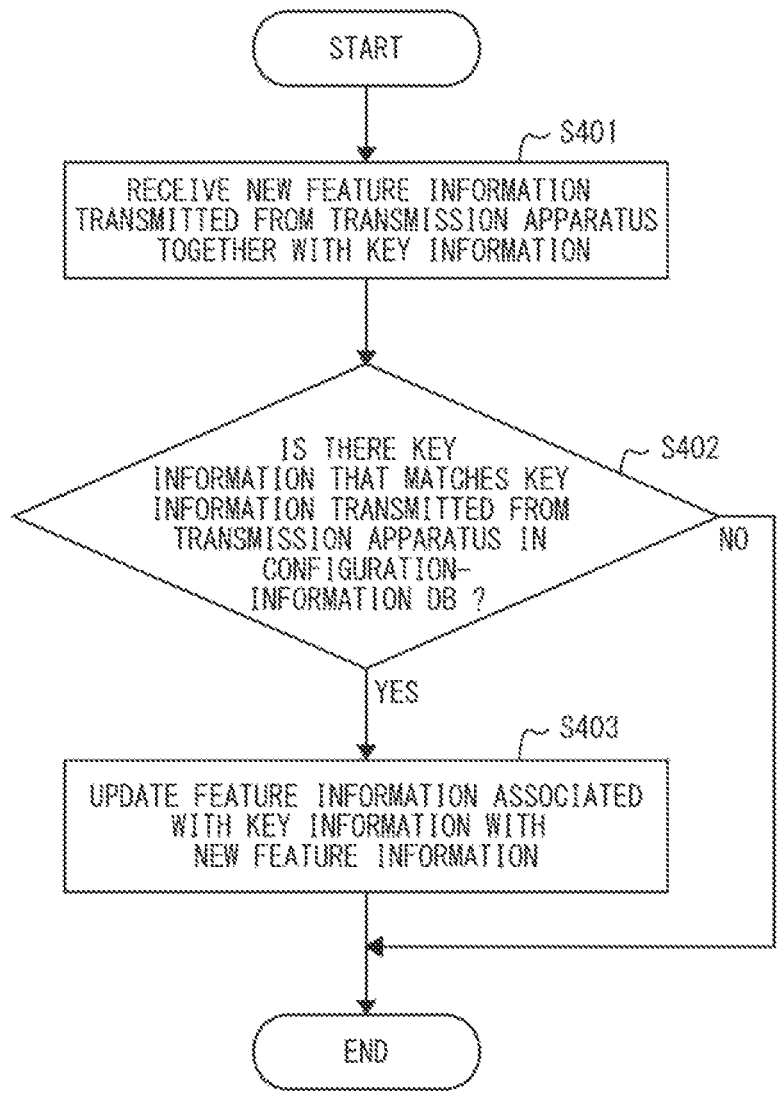
FIG. 7 is a flowchart showing a flow of updating of feature information by the management apparatus provided in the management system shown in FIG. 2.
Figure 8:
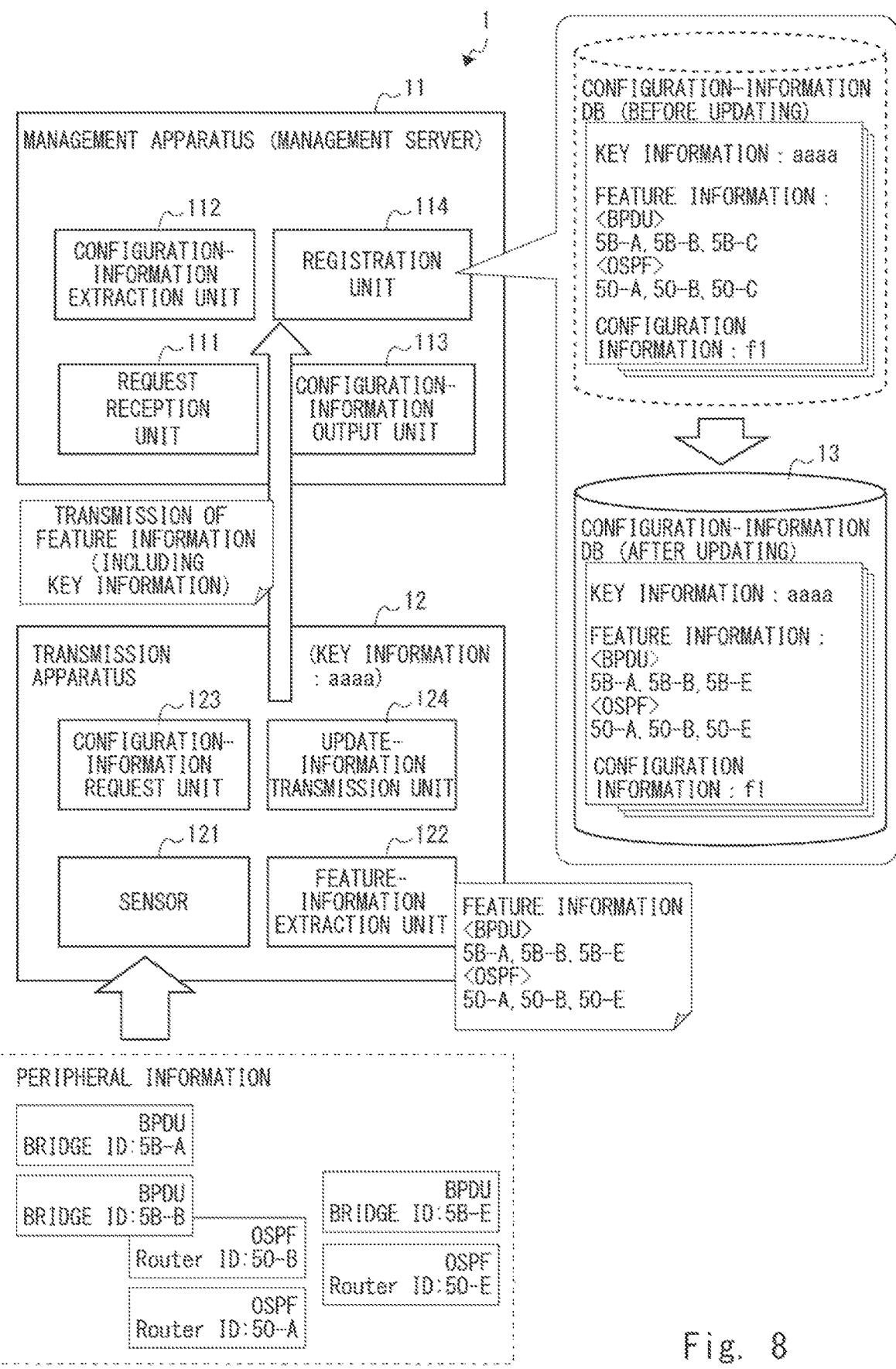
FIG. 8 is a diagram for explaining the flow of the updating of the feature information in the management system shown in FIG. 2.

Next, a flow of updating of feature information in the management system 1 will be described with reference to FIGS. 6, 7, and 8. FIG. 6 is a flowchart showing a flow of a notification of update information transmitted from the transmission apparatus 12 to the management apparatus 11. FIG. 7 is a flowchart showing a flow of updating of feature information by the management apparatus 11. FIG. 8 is a diagram for explaining the flow of the updating of the feature information in the management system 1.

Firstly, a flow of a notification of update information transmitted from the transmission apparatus 12 to the management apparatus 11 will be described with reference to FIGS. 6 and 8.

In the transmission apparatus 12, even after the configuration information is input, peripheral information is collected by the sensor 121 (step S301). The feature-information extraction unit 122 extracts feature information from the peripheral information collected by the sensor 121. Then, the update-information transmission unit 124 transmits the feature information which has been newly extracted by the feature-information extraction unit 122 to the management apparatus 11 together with the key information (step S302). The above-described series of operations are continued until the transmission apparatus 12 is powered off (step S303).

In the example shown in FIG. 8, the update-information transmission unit 124 transmits, to the management apparatus 11, a serial number aaaa as key information, and BRIDGE IDs: 5B-A, 5B-B and 5B-E and Router IDs: 5O-A, 5O-B and 5O-E as feature information.

Next, a flow of updating of feature information by the management apparatus 11 will be described with reference to FIGS. 7 and 8.

In the management apparatus 11, the registration unit 114 receives the key information and the feature information transmitted from the update-information transmission unit 124 of the transmission apparatus 12 (step S401).

After that, the registration unit 114 associates the feature information transmitted from the update-information transmission unit 124 of the transmission apparatus 12 with corresponding key information and configuration information, and registers them in the configuration-information DB 13 again (YES in step S402->step S403).

Specifically, firstly, the registration unit 114 retrieves key information that matches the key information transmitted from the update-information transmission unit 124 of the transmission apparatus 12 together with the feature information from among a plurality of pieces of key information registered in the configuration-information DB 13 (step S402).

For example, when there is key information that matches the key information transmitted from the update-information transmission unit 124 of the transmission apparatus 12 in the configuration-information DB 13 (YES in step S402), the registration unit 114 overwrites the feature information associated with that key information and the configuration information with new feature information (step S403).

In the example shown in FIG. 8, the feature information is rewritten (i.e., updated) from BRIDGE IDs: 5B-A to 5B-C and Router IDs: 5O-A to 5O-C to BRIDGE IDs: 5B-A, 5B-B and 5B-E and Router IDs: 5O-A, 5O-B and 5O-E, respectively.

Note that when there is no key information that matches the key information transmitted from the update-information transmission unit 124 of the transmission apparatus 12 in the configuration-information DB 13 (NO in step S402), the registration unit 114 does not update the feature information registered in the configuration-information DB 13.

As described above, in the management system 1, even after the configuration information is input to the transmission apparatus 12, the feature information registered in the configuration-information DB 13 is continuously updated. In this way, it is possible to prevent the feature information, which is used to associate the transmission apparatus 12 with the configuration information, from becoming out-of-date.

First Modified Example of Management System 1

Figure 9:
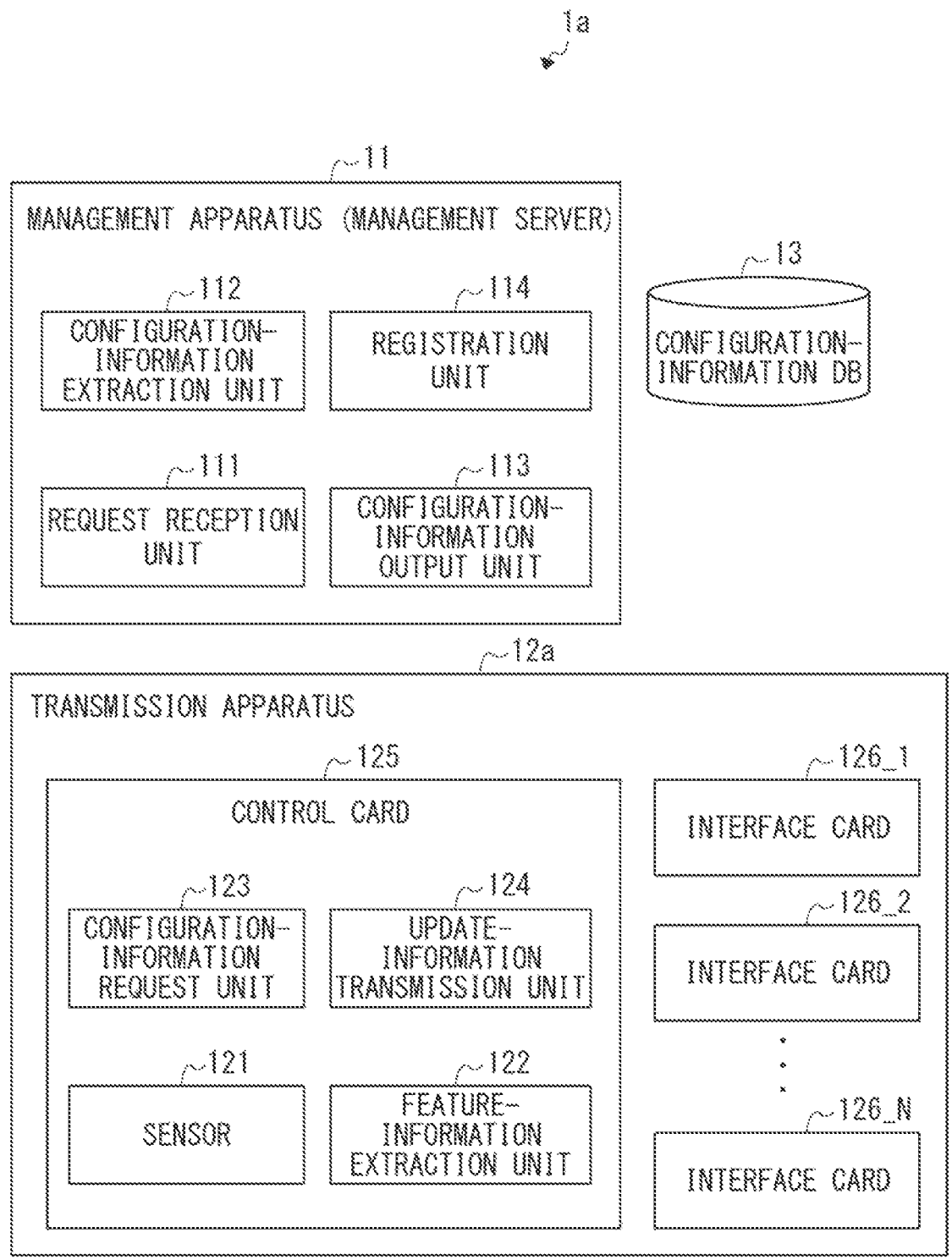
FIG. 9 is a block diagram showing a first modified example of the management system shown in FIG. 2.

FIG. 9 is a block diagram showing a management system 1a which is a first modified example of the management system 1. As compared to the management system 1, the management system 1a includes a transmission apparatus 12a in place of the transmission apparatus 12.

The transmission apparatus 12a includes a control card 125 and N interface cards 126-1 to 126_N (N is an integer equal to or greater than one). Each of the cards is replaceable.

The control card 125 includes a sensor 121, a feature-information extraction unit 122, a configuration-information request unit 123, and an update-information transmission unit 124, which are equivalent to those provided in the transmission apparatus 12. Further, configuration information input by (i.e., transmitted from) the management apparatus 11 is held in the control card 125.

Note that the sensor 121 does not collect packets transmitted from the peripheral transmission apparatus 52 as peripheral information, but collects data about the interface cards 126_1 to 126_N provided in the own apparatus as peripheral information. The feature-information extraction unit 122 extracts, as the feature information, a mounting place (i.e., a place where the interface card is disposed) and a serial number of each of the interface cards 126_1 to 126_N.

The rest of the configuration and the operations of the transmission apparatus 12a are the same as those of the transmission apparatus 12, and therefore descriptions thereof are omitted.

As described above, in the management system 1a, the sensor 121 provided in the transmission apparatus 12a does not collect packets transmitted from the peripheral transmission apparatus 52 as the peripheral information, but collects data about the interface cards and the like provided in the own apparatus as the peripheral information. The feature information such as the mounting places and the serial numbers of the interface cards provided in the own apparatus is extracted from this peripheral information. In this way, the management apparatus 11 can select appropriate configuration information by using the feature information such as the mounting places and the serial numbers of the interface cards, and input (e.g., transmit) the selected configuration information to the transmission apparatus 12a even when the control card 125 provided in the transmission apparatus 12a has been replaced due to a failure thereof or the like.

In this example embodiment, an example case in which the sensor 121 provided in the transmission apparatus 12a does not collect packets transmitted from the peripheral transmission apparatus 52 as peripheral information, but collects data about interface cards and the like provided in the own apparatus as peripheral information has been described. However, the present disclosure is not limited to this example. The sensor 121 provided in the transmission apparatus 12a may collect packets transmitted from the peripheral transmission apparatus 52 as peripheral information, and may also collect data about interface cards and the like provided in the own apparatus as peripheral information.

Second Modified Example of Management System 1

Figure 10:
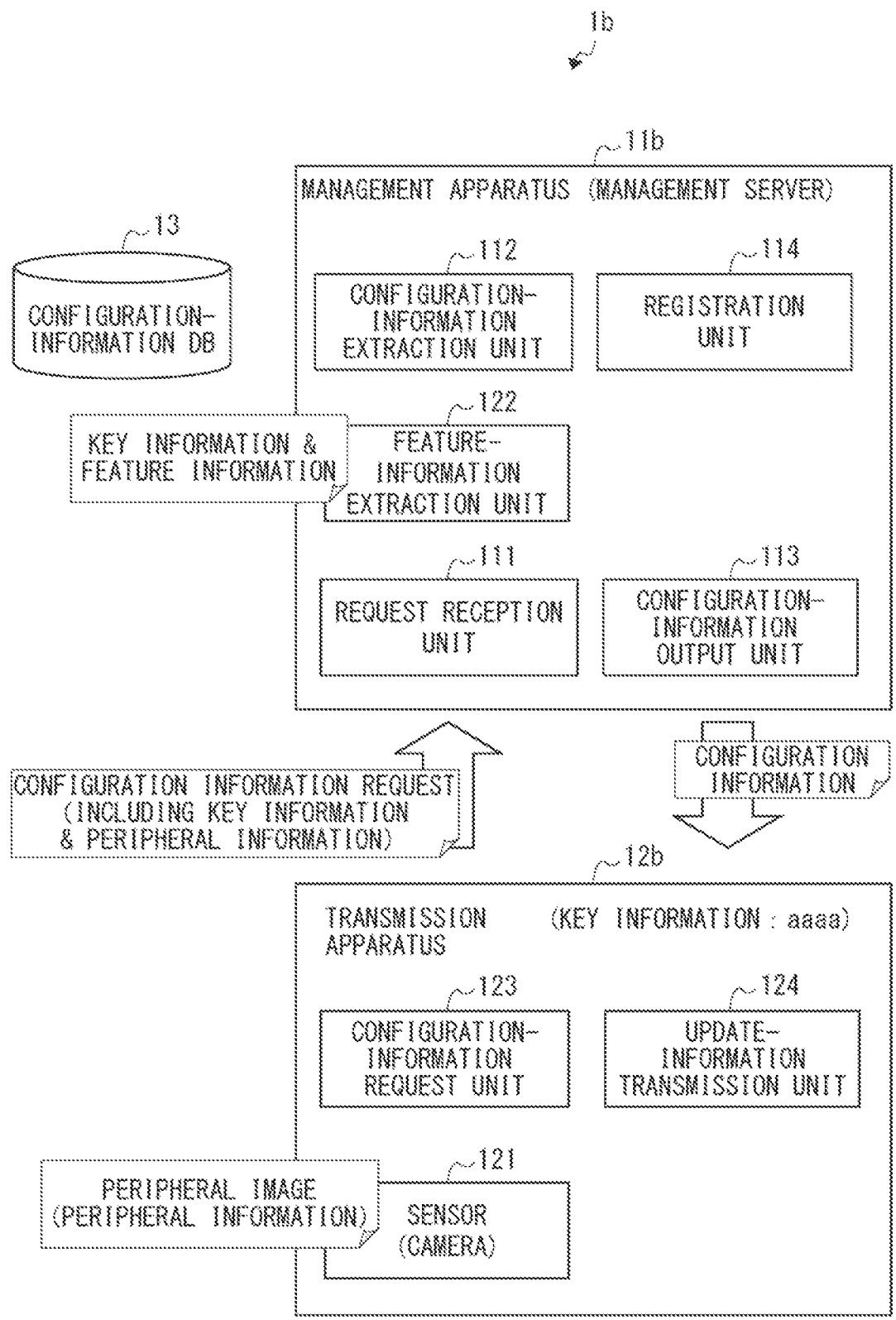
FIG. 10 is a block diagram showing a second modified example of the management system shown in FIG. 2.

FIG. 10 is a block diagram showing a management system 1b which is a second modified example of the management system 1. As compared to the management system 1, the management system 1b includes a management apparatus 11b in place of the management apparatus 11, and a transmission apparatus 12b in place of the transmission apparatus 12.

Note that, in the management system 1b, the feature-information extraction unit 122 is disposed in the management apparatus 11b instead of being disposed in the transmission apparatus 12b. That is, in the transmission apparatus 12b, the configuration-information request unit 123 directly transmits peripheral information collected by the sensor 121 to the management apparatus 11b, and in the management apparatus 11b, the feature-information extraction unit 122 extracts feature information from the acquired peripheral information.

The sensor 121 is, for example, a camera, and photographs (or films) a peripheral transmission apparatus 52 disposed near the transmission apparatus 12b. Note that the data size of the peripheral image (i.e., the image of surrounds of the transmission apparatus 12b) taken by the sensor 121 is relatively small. Further, high calculation performance is required to extract feature information from the peripheral image (e.g., from video-image information) taken by the sensor 121. In such a case, similarly to the management system 1b, the feature-information extraction unit 122 may be disposed in the management apparatus 11b instead of being disposed in the transmission apparatus 12b.

Third Modified Example of Management System 1

Figure 11:
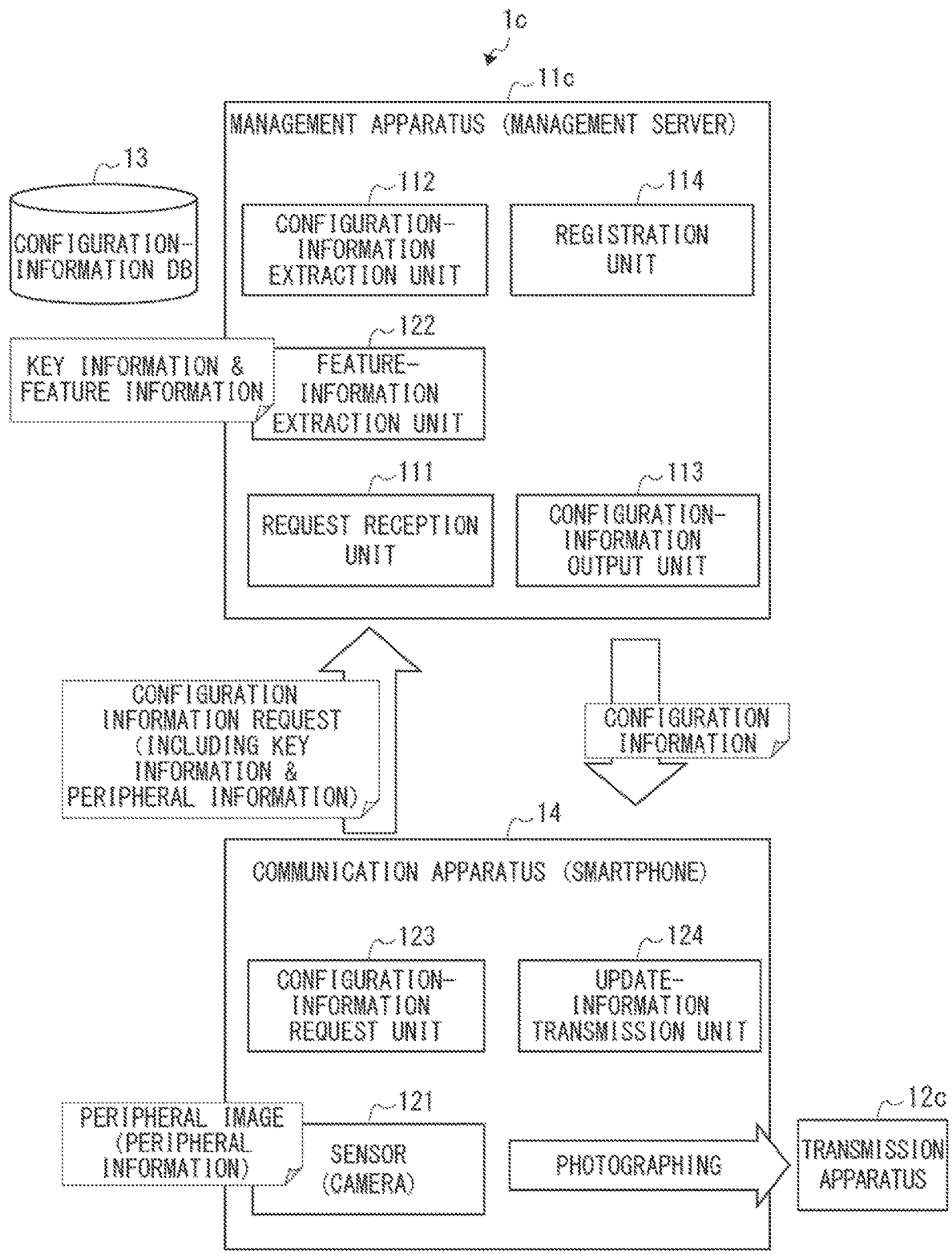
FIG. 11 is a block diagram showing a third modified example of the management system shown in FIG. 2.

FIG. 11 is a block diagram showing a management system 1c which is a third modified example of the management system 1. The management system 1c includes a management apparatus 11c in place of the management apparatus 11, a transmission apparatus 12c in place of the transmission apparatus 12, and further includes a communication apparatus 14 such as a smartphone.

Similarly to the management apparatus 11b, the management apparatus 11c further includes a feature-information extraction unit 122 in addition to the components of the management apparatus 11. The transmission apparatus 12c is provided in the communication apparatus 14. The sensor 121, the configuration-information request unit 123, and the update-information transmission unit 124 are disposed in the communication apparatus 14 instead of being disposed in the transmission apparatus 12c.

The sensor 121 is, for example, a camera, and photographs (or films) an area around the transmission apparatus 12c disposed in the communication apparatus 14. Note that the data size of the peripheral image (i.e., the image of the area around the transmission apparatus 12c) taken by the sensor 121 is relatively small. Further, high calculation performance is required to extract feature information from the peripheral image taken by the sensor 121. In such a case, similarly to the management system 1c, the feature-information extraction unit 122 may be disposed in the management apparatus 11c. Note that, in this case, in the management apparatus 11c, feature information is extracted from the peripheral image in which a part corresponding to the transmission apparatus 12 is masked.

In this way, in the management system 1c, the management apparatus 11c can select appropriate configuration information based on feature information obtained from peripheral information collected by the sensor 121 located outside the transmission apparatus 12c, and input (e.g., transmit) the selected configuration information to the transmission apparatus 12c. In this way, the management apparatus 11c can select appropriate configuration information and input (e.g., transmit) the selected configuration information to the transmission apparatus 12c even in a situation in which a communication path between the transmission apparatus 12c and the management apparatus 11c is not established unless the configuration information is input to the transmission apparatus 12c.

Note that the delivery of configuration information from the communication apparatus 14 to the transmission apparatus 12c can be performed by using an arbitrary method. For example, the delivery of the configuration information from the communication apparatus 14 to the transmission apparatus 12c is performed by using WiFi (Registered Trademark) or an IF (Interface) for setting provided in the transmission apparatus 12c.

Although example embodiments according to the present disclosure have been described in detail with reference to the drawings, the specific configurations are not limited to those described above, and various design changes and the like can be made without departing from the scope and spirit of the present disclosure.

Note that, in the present disclosure, the processes performed by the management apparatuses 10 and 11 and the transmission apparatus 12, which have been described as hardware processing, can be implemented, for example, by causing a CPU to execute a computer program(s).

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

According to an example embodiment, it is possible to provide a management apparatus, a management system, a management method, and a management program capable of applying appropriate configuration information to a transmission apparatus.

The first and second embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The whole or part of the example embodiments disclosed above can be described as, but not limited to, the following supplementary notes.

(Supplementary Note 1)

A management apparatus comprising:

a request reception unit configured to receive a transmission request for configuration information transmitted from a transmission apparatus or a communication apparatus including the transmission apparatus disposed therein, together with key information unique to the transmission apparatus and feature information obtained from peripheral information of the transmission apparatus, the key information and the feature information being added in the transmission request;

a configuration-information extraction unit configured to extract configuration information corresponding to the key information and the feature information added in the transmission request received by the request reception unit from a database in which a combination of key information, feature information, and configuration information for each transmission apparatus is registered; and a configuration-information output unit configured to output the configuration information extracted by the configuration-information extraction unit to the transmission apparatus or the communication apparatus that has transmitted the transmission request.

(Supplementary Note 2)

The management apparatus described in Supplementary note 1, wherein when there is configuration information corresponding to the key information added in the transmission request in the database, the configuration-information extraction unit extracts this configuration information from the database, and when there is no configuration information corresponding to the key information added in the transmission request in the database, the configuration-information extraction unit extracts the configuration information corresponding to the feature information added in the transmission request from the database.

(Supplementary Note 3)

The management apparatus described in Supplementary note 2, wherein when there is no configuration information corresponding to the key information added in the transmission request in the database, the configuration-information extraction unit extracts the configuration information corresponding to the feature information with which a degree of matching of the feature information added in the transmission request is equal to or larger than a predetermined threshold from among a plurality of pieces of configuration information registered in the database from the database.

(Supplementary Note 4)

The management apparatus described in any one of Supplementary notes 1 to 3, wherein the peripheral information includes a packet of a control protocol that the transmission apparatus has received from another transmission apparatus, and the feature information includes identification information of the other transmission apparatus extracted from the packet of the control protocol.

(Supplementary Note 5)

The management apparatus described in any one of Supplementary notes 1 to 4, wherein the peripheral information includes data received from an interface card provided in the transmission apparatus, and the feature information includes at least one of a mounting place of the interface card and a serial number thereof.

(Supplementary Note 6)

The management apparatus described in any one of Supplementary notes 1 to 5, wherein the request reception unit is configured to receive a transmission request for configuration information transmitted from the transmission apparatus or the communication apparatus including the transmission apparatus disposed therein, together with key information unique to the transmission apparatus and peripheral information of the transmission apparatus, the key information and the feature information being added in the transmission request, the management apparatus further comprises a feature-information extraction unit configured to extract the feature information from the peripheral information added in the transmission request received by the request reception unit, the peripheral information includes video-image information obtained by photographing a periphery of the transmission apparatus, and the feature information includes information for identifying a peripheral device, included in the video-image information.

(Supplementary Note 7)

The management apparatus described in any one of Supplementary notes 1 to 6, further comprising an updating-process unit configured to overwrite feature information registered in the database with corresponding feature information that has been newly collected in the transmission apparatus or the communication apparatus including the transmission apparatus disposed therein.

(Supplementary Note 8)

A management system comprising:

a transmission apparatus; and a management apparatus described in any one of Supplementary notes 1 to 3.

(Supplementary Note 9)

The management system described in Supplementary note 8, wherein the transmission apparatus further comprises:

a sensor configured to collect the peripheral information; and a configuration-information request unit configured to add key information unique to the own apparatus and feature information obtained from the peripheral information collected by the sensor in a transmission request for configuration information for the own apparatus, and then transmit the transmission request to the management apparatus in order to request the management apparatus to transmit the configuration information.

(Supplementary Note 10)

The management system described in Supplementary note 9, wherein the transmission apparatus further comprises a feature-information extraction unit configured to extract the feature information from the peripheral information collected by the sensor, the sensor collects a packet of a control protocol transmitted from another transmission apparatus, and the feature-information extraction unit extracts, as the feature information, identification information of the other transmission apparatus from the packet of the control protocol collected by the sensor.

(Supplementary Note 11)

The management system described in Supplementary note 9, wherein the transmission apparatus further comprises a feature-information extraction unit configured to extract the feature information from the peripheral information collected by the sensor, the sensor collects data transmitted from an interface card provided in the transmission apparatus, and the feature-information extraction unit extracts, as the feature information, at least one of a mounting place of the interface card and a serial number thereof from the data collected by the sensor.

(Supplementary Note 12)

The management system described in Supplementary note 9, wherein in the transmission apparatus, the sensor is a camera configured to photograph a periphery of the transmission apparatus, the configuration-information request unit is configured to add key information unique to the transmission apparatus and video-image information obtained by photographing the periphery of the transmission apparatus in a transmission request for configuration information for the own apparatus, and then transmit the transmission request to the management apparatus in order to request the management apparatus to transmit the configuration information, and the management apparatus further comprises a feature-information extraction unit configured to extract information for identifying a peripheral device of the transmission apparatus from the video-image information added in the transmission request received by the request reception unit.

(Supplementary Note 13)

The management system described in any one of Supplementary notes 9 to 12, wherein the transmission apparatus further comprises a transmission unit configured to transmit new feature information obtained from the peripheral information newly collected by the sensor, and the management apparatus further comprises an updating-process unit configured to overwrite feature information registered in the database with corresponding feature information that has been newly collected in the transmission apparatus or the communication apparatus including the transmission apparatus disposed therein.

(Supplementary Note 14)

The management system described in Supplementary note 8, wherein the transmission apparatus is disposed in a communication apparatus, the communication apparatus comprises:

a sensor configured to collect the peripheral information; and a configuration-information request unit configured to add key information unique to the transmission apparatus and feature information obtained from the peripheral information collected by the sensor in a transmission request for configuration information for the own apparatus, and then transmit the transmission request to the management apparatus in order to request the management apparatus to transmit the configuration information.

(Supplementary Note 15)

The management system described in Supplementary note 14, wherein in the communication apparatus, the sensor is a camera configured to photograph a periphery of the transmission apparatus, the configuration-information request unit is configured to add key information unique to the transmission apparatus and video-image information obtained by photographing the periphery of the transmission apparatus in a transmission request for configuration information for the own apparatus, and then transmit the transmission request to the management apparatus in order to request the management apparatus to transmit the configuration information, and the management apparatus further comprises a feature-information extraction unit configured to extract information for identifying a peripheral device of the transmission apparatus from the video-image information added in the transmission request received by the request reception unit.

(Supplementary Note 16)

The management system described in Supplementary note 14 or 15, wherein the communication apparatus further comprises a transmission unit configured to transmit new feature information obtained from the peripheral information that has been newly collected by the sensor.

(Supplementary Note 17)

A management method comprising:

receiving a transmission request for configuration information transmitted from a transmission apparatus or a communication apparatus including the transmission apparatus disposed therein, together with key information unique to the transmission apparatus and feature information obtained from peripheral information of the transmission apparatus, the key information and the feature information being added in the transmission request;

extracting configuration information corresponding to the key information and the feature information added in the transmission request from a database in which a combination of key information, feature information, and configuration information for each transmission apparatus is registered; and outputting the extracted configuration information to the transmission apparatus or the communication apparatus that has transmitted the transmission request.

(Supplementary Note 18)

A management program for causing a computer to perform:

a process for receiving a transmission request for configuration information transmitted from a transmission apparatus or a communication apparatus including the transmission apparatus disposed therein, together with key information unique to the transmission apparatus and feature information obtained from peripheral information of the transmission apparatus, the key information and the feature information being added in the transmission request;

a process for extracting configuration information corresponding to the key information and the feature information added in the transmission request from a database in which a combination of key information, feature information, and configuration information for each transmission apparatus is registered; and a process for outputting the extracted configuration information to the transmission apparatus or the communication apparatus that has transmitted the transmission request.

What is claimed is:

1. A management apparatus comprising:
   at least one memory; and
   at least one processor connected to the at least one memory, wherein the at least one processor is configured to:
   receive a transmission request for configuration information transmitted from a transmission apparatus or a communication apparatus including the transmission apparatus disposed therein, together with key information unique to the transmission apparatus and feature information obtained from peripheral information of the transmission apparatus, the key information and the feature information being added in the transmission request;
   in response to a database including the configuration information corresponding to the key information, extract the configuration information from the database, wherein a combination of the key information, the feature information, and the configuration information is registered in the database, and output the extracted configuration information to the transmission apparatus or the communication apparatus that transmitted the transmission request; and
   in response to the database not including the configuration information corresponding to the key information, extract other configuration information from the database corresponding to the feature information with which a degree of matching of the feature information equal to or larger than a predetermined threshold, and output the extracted other confirmation information to the transmission apparatus or the communication apparatus that transmitted the transmission request.

2. The management apparatus according to claim 1, wherein
   the peripheral information includes a packet of a control protocol that the transmission apparatus received from another transmission apparatus, and
   the feature information includes identification information of the other transmission apparatus extracted from the packet of the control protocol.

3. The management apparatus according to claim 1, wherein
   the peripheral information includes data received from an interface card provided in the transmission apparatus, and
   the feature information includes at least one of a mounting place of the interface card and a serial number thereof.

4. The management apparatus according to claim 1, wherein
   the at least one processor is further configured to extract the feature information from the peripheral information,
   the peripheral information includes video-image information obtained by photographing a periphery of the transmission apparatus, and
   the feature information includes information for identifying the peripheral device, included in the video-image information.

5. The management apparatus according to claim 1, wherein the at least one processor is further configured to overwrite the feature information registered in the database with corresponding feature information that has been newly collected in the transmission apparatus or the communication apparatus including the transmission apparatus disposed therein.

6. A management system comprising:
a transmission apparatus; and
a management apparatus according to claim 1, wherein the transmission apparatus comprises:
at least one transmitting-side memory; and
at least one transmitting-side processor connected to the at least one transmitting-side memory,
the at least one transmitting-side processor is configured to:
collect the peripheral information; and
add the key information and the feature information obtained from the collected peripheral information in the transmission request for the configuration information, and transmit the transmission request to the management apparatus in order to request the management apparatus to transmit the configuration information.

7. A management method comprising:
receiving a transmission request for configuration information transmitted from a transmission apparatus or a communication apparatus including the transmission apparatus disposed therein, together with key information unique to the transmission apparatus and feature information obtained from peripheral information of the transmission apparatus, the key information and the feature information being added in the transmission request;
in response to a database including the configuration information corresponding to the key information, extracting the configuration information from the database, wherein a combination of the key information, the feature information, and the configuration information is registered in the database, and outputting the extracted configuration information to the transmission apparatus or the communication apparatus that transmitted the transmission request; and
in response to the database not including the configuration information corresponding to the key information, extracting other configuration information from the database corresponding to the feature information with which a degree of matching of the feature information is equal to or larger than a predetermined threshold, and outputting the extracted other confirmation information to the transmission apparatus or the communication apparatus that transmitted the transmission request.

8. A non-transitory computer readable medium storing a management program for causing a computer to perform processes for:
receiving a transmission request for configuration information transmitted from a transmission apparatus or a communication apparatus including the transmission apparatus disposed therein, together with key information unique to the transmission apparatus and feature information obtained from peripheral information of the transmission apparatus, the key information and the feature information being added in the transmission request;
in response to a database including the configuration information corresponding to the key information, extracting the configuration information from the database, wherein a combination of the key information, the feature information, and the configuration information is registered in the database, and outputting the extracted configuration information to the transmission apparatus or the communication apparatus that transmitted the transmission request; and
in response to the database not including the configuration information corresponding to the key information, extracting other configuration information from the database corresponding to the feature information with which a degree of matching of the feature information is equal to or larger than a predetermined threshold, and outputting the extracted other confirmation information to the transmission apparatus or the communication apparatus that transmitted the transmission request.

* * * * *